C. W. NICHOLS & H. P. MEYERS.
WHEEL.
APPLICATION FILED OCT. 3, 1912.
1,087,504.
Patented Feb. 17, 1914.
2 SHEETS—SHEET 1.
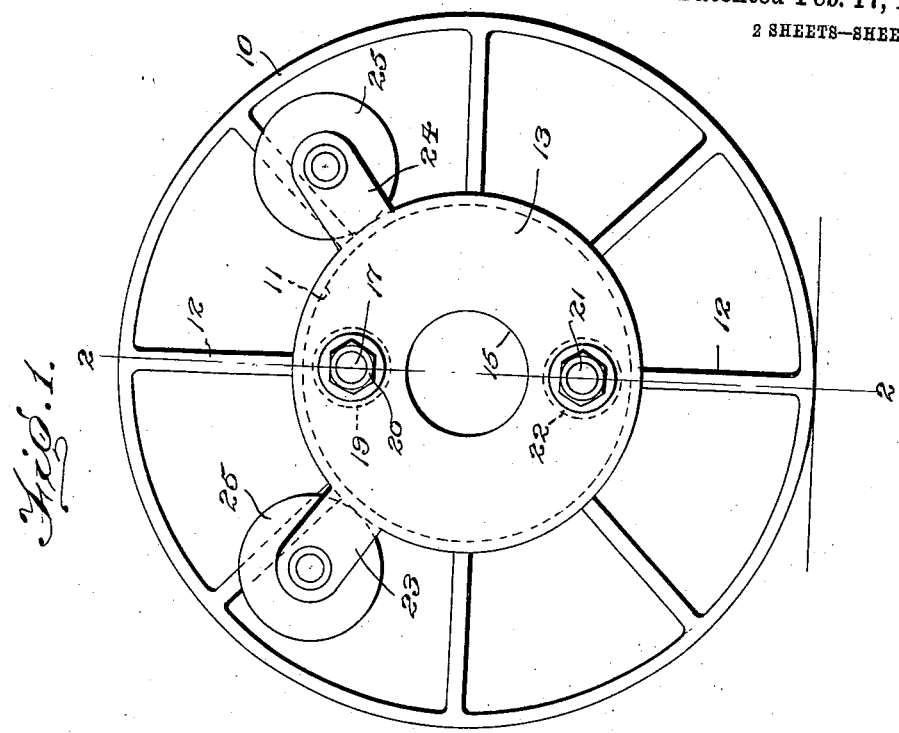
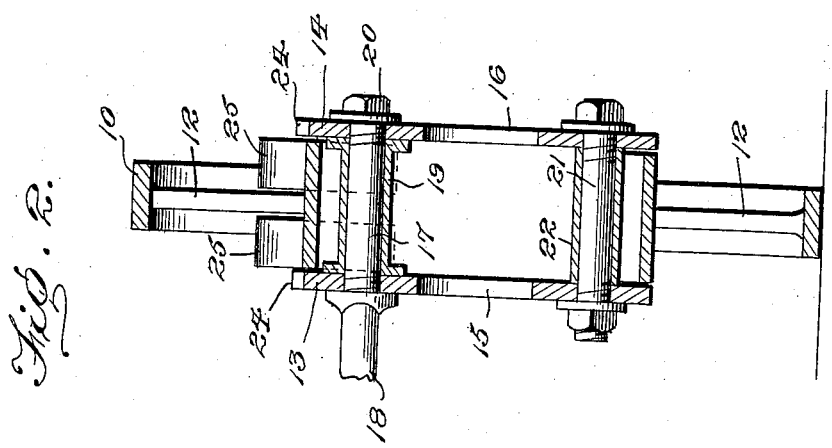
Witnesses
Inventors
C. W. Nichols.
H. P. Meyers.
By
Attorneys.

C. W. NICHOLS & H. P. MEYERS.
WHEEL.
APPLICATION FILED OCT. 3, 1912.
1,087,504.
Patented Feb. 17, 1914.
2 SHEETS—SHEET 2.
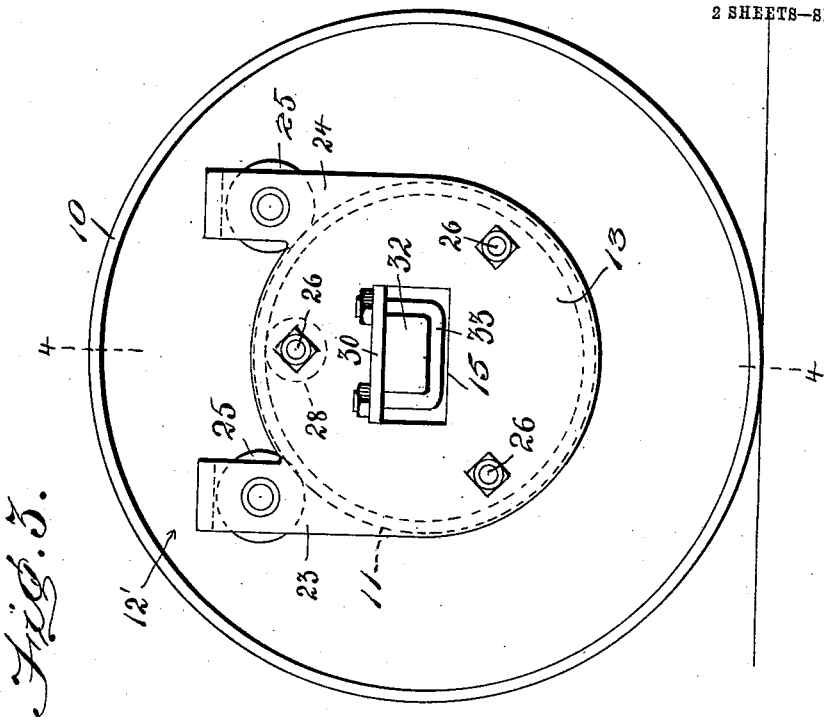
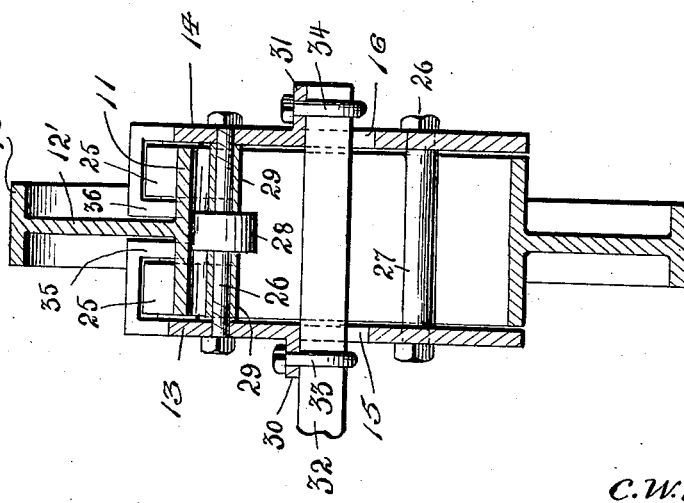
Inventors
C. W. Nichols.
H. P. Meyers.

UNITED STATES PATENT OFFICE.

CHARLES W. NICHOLS AND HENRY P. MEYERS, OF NEW ORLEANS, LOUISIANA, ASSIGNORS, BY DIRECT AND MESNE ASSIGNMENTS, TO THE AXLELESS WHEEL MANUFACTURING COMPANY, LIMITED, OF NEW ORLEANS, LOUISIANA, A CORPORATION OF LOUISIANA.

WHEEL.

1,087,504.      Specification of Letters Patent.      Patented Feb. 17, 1914.

Application filed October 3, 1912. Serial No. 723,795.

*To all whom it may concern:*

Be it known that we, CHARLES W. NICHOLS and HENRY P. MEYERS, citizens of the United States, residing at New Orleans, in the parish of Orleans and State of Louisiana, have invented certain new and useful Improvements in Wheels, of which the following is a specification.

This invention relates to improvements in wheels and has for one of its objects to improve the construction and increase the efficiency and the tractive force, and likewise to reduce the friction.

Another object of the invention is to provide a wheel of improved construction which may be applied without material structural change to vehicles of various kinds and to vehicles employed for various purposes.

Another object of the invention is to provide a simply constructed wheel wherein the weight of the load of the vehicle is located constantly above the center of the wheel, whereby the "leverage" is increased and the power required to move the load greatly decreased.

With these and other objects in view the invention consists in certain novel features of construction as hereinafter shown and described and then specifically pointed out in the claims, and in the drawings illustrative of the preferred embodiment of the invention, Figure 1 is a side elevation of one of the improved wheels. Fig. 2 is a section on the line 2—2 of Fig. 1. Fig. 3 is a view similar to Fig. 1 illustrating a modification in the construction. Fig. 4 is a section on the line 4—4 of Fig. 3.

Corresponding and like parts are referred to in the following description and indicated in all the views of the accompanying drawings by the same reference characters.

The improved wheel comprises an outer rim or felly portion 10 and an inner or bearing rim 11 of less diameter than the outer rim and concentric thereto. The rims 10—11 are connected at suitable intervals either by spokes or arms 12 as shown in Figs. 1 and 2 or by a web 12' as shown in Figs. 3 and 4. The spokes or arms or the web, as the case may be, are relatively thin so that the edges of the inner rim 11 are unobstructed as represented in Figs. 2 and 4. The inner rim 11 is preferably of greater width than the outer rim 10, as shown in Figs. 2 and 4. Bearing against the edges of the inner rim 11 are disks or plates 13—14, each preferably provided with an opening represented respectively at 15—16.

In the form of the construction shown in Figs. 1 and 2 the journal 17 of the axle 18 is extended through the plates 13—14 and provided with a spacing sleeve 19 and a clamp nut 20, whereby the plates are united and retained in separated position relative to the rim 11. The plates 13—14 are also united by a transverse bolt 21 and a spacing sleeve 22. The plates 13—14 are provided respectively with radial arms which diverge therefrom at opposite sides of the center and are directed upwardly and outwardly. One pair of these arms is represented at 23—24, and it will be understood that each of the plates is provided with a pair of the arms. Each of the arms is designed to receive a friction roller 25 which rotates continuously upon the outer face of the inner rim 11. The rollers which are associated with the plate 14 rotate upon the rim 11 outside of the spokes 12 or the web 12', as the case may be, while the rollers 25 which are associated with the plate 13 rotate upon the rim 11 inside of the spokes 12 or the web 12', as the case may be. By this means it will be obvious that when a pulling force is applied to the axle 18 the body of the wheel will be caused to rotate through the coaction of the plates 12—13 and the rollers 25.

The improved wheel construction may be employed in roller skates, furniture casters, trolley wheels, railway cars and the like.

In the improved construction the line of draft, or the "pull" is disposed above the center of the rims, hence the leverage is increased to a degree corresponding to the amount of such elevation, consequently the load can be moved by the application of a correspondingly reduced power. In an ordinary wheel, the weight to be moved is directly over the center line and the "leverage" is never more than the radius of the wheel, whereas by the improved arrangement, the leverage is equal to the radius of the outer rim, plus the distance between the center of the inner rim and the center of the rollers 25.

By the arrangement shown vehicles having the wheels provided with the outer rims of relatively small diameter and carrying a given load can be moved with less power than a vehicle having wheels of ordinary construction.

When the improved device is to be applied to an ordinary wagon or cart the arrangement shown in Figs. 3 and 4 will be employed, the axle journal 17 and clamp bolt 21 being replaced by a plurality of binding bolts 26 with one of the bolts located at the upper side and two bolts at the lower side. The lower bolts are provided with spacing sleeves 27 while the upper bolts are provided with a central roller 28 bearing against the inner face of the drum 11 and retained in place by spacing sleeves 29. When the modified construction is employed an axle will not be required, but the ordinary bolsters are preferably extended endwise, or bolsters of extra length are used, and the plates 13—14 rigidly connected to the bolsters, as shown in Figs. 3-4. When the modified structure is employed the plate 13 will be provided with an integral lateral flange 30 while a similar lateral flange 31 extends from the plate 14, the flanges being located above the apertures 15—16. The bolster is represented conventionally at 32 and is coupled to the flanges 30—31 by U bolts 33—34. By this means the plates 13—14 are rigidly coupled to the bolster and serve the same purpose as the axle 18 and its journal 17 in the construction shown in Figs. 1 and 2, except that the bolster is necessarily located substantially centrally of the wheel rims. In the modified structure also the arms 23—24 are arranged to extend tangentially of the plates 13—14 and are curved over at their upper ends as shown at 35—36 to form curved or inverted U-shaped supports for the journals of the rollers 25. By this means the rollers are firmly supported and deflection effectually prevented.

The construction illustrated in Figs. 3 and 4 will be employed more particularly for the heavier class of vehicles, but either construction may be employed, as required.

The improved device is simple in construction, can be strongly and compactly manufactured, and provides a wheel which is capable of effectually resisting the severe strains to which it will be subjected when in use while at the same time materially reducing the friction.

Having thus described our invention, what we claim is:

1. In a device of the class described, a body including a hollow inner rim having an external bearing face, supporting members engaging against the ends of said hollow rim and having radial arms, bearing rollers pivoted in said radial arms and engaging the bearing face of said inner rim, and an axle connected to said supporting members and extending through said hollow inner rim.

2. In a device of the class described, a body including an inner rim having outer and inner bearing faces, supporting members bearing upon opposite sides of said inner rim, bearing rollers carried by said supporting members and engaging the outer bearing face of said inner rim, a bearing roller carried by said supporting members and engaging the inner bearing face of said inner rim, and means adapted to connect the running gear of a vehicle to said supporting members.

3. In a device of the class described, a body including an inner rim having an external bearing face, supporting members bearing upon opposite sides of said inner rim and provided with extended arms having their terminals directed inwardly toward the inner rim, bearing rollers mounted for rotation at one end in said extended arms and at the other end in the inwardly directed terminals of the same, and an axle connecting said supporting members.

In testimony whereof we affix our signatures in presence of two witnesses.

CHARLES W. NICHOLS. [L. S.]
HENRY P. MEYERS. [L. S.]

Witnesses:
  VICTOR ROBIN,
  T. E. BERG.

Copies of this patent may be obtained for five cents each, by addressing the "Commissioner of Patents, Washington, D. C."